United States Patent
Manabe et al.

(10) Patent No.: US 7,620,313 B2
(45) Date of Patent: Nov. 17, 2009

(54) DRIVING MECHANISM

(75) Inventors: Mitsuo Manabe, Saitama (JP); Takeshi Ichimiya, Saitama (JP)

(73) Assignee: Fujinon Corporation, Saitama (JP)

(*) Notice: Subject to any disclaimer, the term of this patent is extended or adjusted under 35 U.S.C. 154(b) by 383 days.

(21) Appl. No.: 11/387,904

(22) Filed: Mar. 24, 2006

(65) Prior Publication Data
US 2006/0238075 A1 Oct. 26, 2006

(30) Foreign Application Priority Data

| Mar. 31, 2005 | (JP) | ............ P.2005-103066 |
| Aug. 12, 2005 | (JP) | ............ P.2005-234519 |
| Feb. 2, 2006 | (JP) | ............ P.2006-026248 |

(51) Int. Cl.
*G03B 13/00* (2006.01)
(52) U.S. Cl. ............ 396/133; 396/185; 396/248; 396/261; 310/323.17
(58) Field of Classification Search ............ 396/133, 396/287, 185, 248, 261, 453, 455; 310/323.12, 310/323.17
See application file for complete search history.

(56) References Cited

U.S. PATENT DOCUMENTS

| 5,013,956 | A | * | 5/1991 | Kurozumi et al. ...... 310/323.11 |
| 5,157,300 | A | * | 10/1992 | Kataoka et al. ........ 310/323.04 |
| 5,548,175 | A | * | 8/1996 | Tamai .................... 310/323.12 |
| 5,589,723 | A | | 12/1996 | Yoshida et al. |
| 5,606,214 | A | * | 2/1997 | Corsaro ...................... 310/329 |
| 5,768,016 | A | * | 6/1998 | Kanbara ...................... 359/557 |
| 5,912,525 | A | | 6/1999 | Kobayashi et al. |
| 6,111,336 | A | | 8/2000 | Yoshida et al. |
| 6,483,226 | B1 | | 11/2002 | Okada |
| 6,528,926 | B2 | * | 3/2003 | Okamoto et al. ....... 310/323.17 |
| 6,541,555 | B1 | * | 4/2003 | Roetcisoender ............. 524/398 |
| 7,154,210 | B2 | * | 12/2006 | Hoshino ..................... 310/317 |
| 7,161,277 | B2 | * | 1/2007 | Yuasa et al. ............ 310/323.02 |
| 2004/0012304 | A1 | | 1/2004 | Yoshida et al. |
| 2004/0195935 | A1 | | 10/2004 | Jansson et al. |

FOREIGN PATENT DOCUMENTS

| EP | 0 675 589 A1 | 10/1995 |
| JP | 3171022 B2 | 3/2001 |
| JP | 3171187 B2 | 3/2001 |
| JP | 2001-211669 A | 8/2001 |
| JP | 2002-142470 A | 5/2002 |

* cited by examiner

*Primary Examiner*—Patrick J. Assouad
*Assistant Examiner*—Linda B Smith
(74) *Attorney, Agent, or Firm*—Birch, Stewart, Kolasch & Birch, LLP

(57) ABSTRACT

A driving mechanism comprises: (i) an actuator comprising: an electro-mechanical conversion element; a driving member which is connected to one end of the electro-mechanical conversion element and moves according to elongation or contraction of the electro-mechanical conversion element; and a weight member provided on the other end of the electro-mechanical conversion element; (ii) a driven member frictionally engaged with the driving member; and (iii) a driving circuit that drives the actuator, wherein the actuator allows the driven member to move along the driving member, and the driving circuit drives the electro-mechanical conversion element at a driving frequency f which gives $f \geq 2^{1/2} \cdot f_0$ when resonance frequency of a 1-freedom system is $f_0$ in which the electro-mechanical conversion element and the driving member are designated as a mass and the weight member is designated as a spring, and driving frequency of the electro-mechanical conversion element is f.

13 Claims, 14 Drawing Sheets

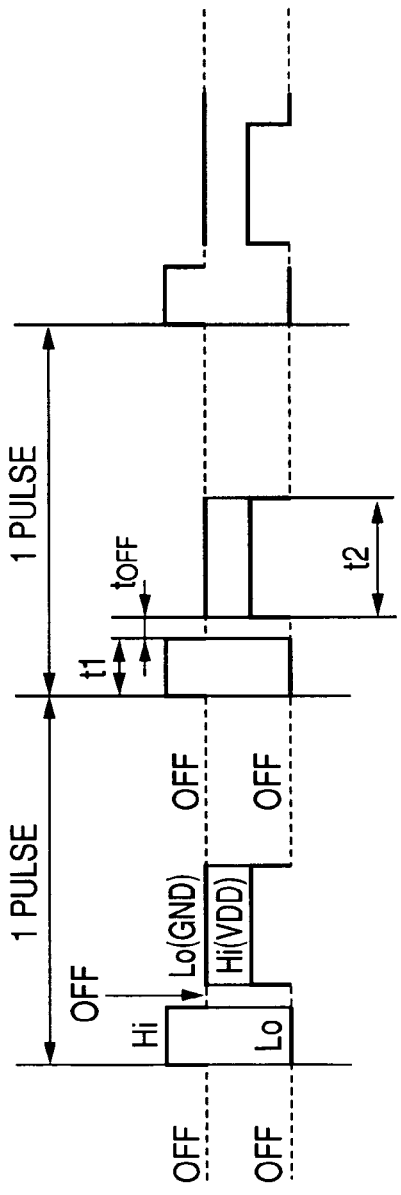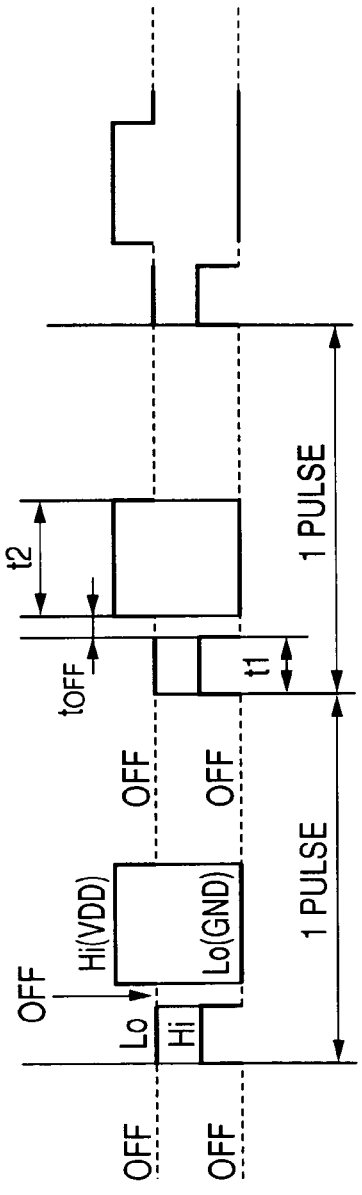

FIG. 16

|          | 1        | 2        | 4        | 5        | 6        |
|----------|----------|----------|----------|----------|----------|
| E(Pa)    | 6.00E+07 | 3.00E+08 | 1.00E+09 | 1.2E+11  | 2E+11    |
| A(m²)    | 3.50E-06 | 3.50E-06 | 3.50E-06 | 3.50E-06 | 3.50E-06 |
| Ma(kg)   | 8.00E-06 | 8.00E-06 | 8.00E-06 | 8.00E-06 | 8.00E-06 |
| Mb(kg)   | 3.00E-05 | 3.00E-05 | 3.00E-05 | 3.00E-05 | 3.00E-05 |
| Mc(kg)   | 2.08E-05 | 2.08E-05 | 2.08E-05 | 2.08E-05 | 2.08E-05 |
| h(m)     | 5.00E-04 | 5.00E-04 | 5.00E-04 | 5.00E-04 | 5.00E-04 |
| fo(kHz)  | 1.54E+01 | 3.44E+01 | 6.28E+01 | 6.88E+02 | 8.88E+02 |

DRIVING MECHANISM

BACKGROUND OF THE INVENTION

1. Field of the Invention

The present invention relates to a driving mechanism, a photographic mechanism in which an optical member is connected to the driving mechanism such as a small digital camera and a web camera and a cellular phone provided with the driving mechanism and the photographic mechanism.

2. Description of the Related Art

An actuator in which an electro-mechanical conversion element such as a piezoelectric element is used is known as a driving mechanism for a lens used in digital cameras and the like. For example, as shown in the embodiments of Japanese Patent No. 3171187 or Japanese Patent No. 3171022, the actuator is, in general, constituted by an electro-mechanical conversion element and a driving member and fixed to a cabinet (or support member) on one end surface of the electro-mechanical conversion element in the elongation and contraction direction. A driving member is fastened to the other end surface of the electro-mechanical conversion element in the elongation and contraction direction, and a driven member is frictionally engaged with the driving member. The above-described constitution makes it possible to transmit a movement in the elongating and contracting direction of the electro-mechanical conversion element to the driving member when a pulse-form voltage is applied to the electro-mechanical conversion element. Where the electro-mechanical conversion element is deformed slowly, the driven member moves together with the driving member. Where the electro-mechanical conversion element is quickly deformed, the driven member remains at the same position due to inertia of the mass. Therefore, the driven member is allowed to move intermittently at a fine pitch by a repeated application of the pulse-form voltage which is different in reciprocating movement.

Since the thus constituted actuator is fixed to a cabinet (or a support member) at one end surface of an electro-mechanical conversion element in the elongation and contraction direction, in association with vibration of the electro-mechanical conversion element, vibration generated on an actuator including a driving member is directly transmitted to the cabinet, thereby causing a problem that vibration has developed between the actuator and the cabinet.

JP-A-2002-142470 has disclosed a mechanism in which a base is provided between an electro-mechanical conversion element and a cabinet, one end surface of the electro-mechanical conversion element in the elongation and contraction direction is fixed to the base, and the base is elastically supported to the cabinet, thereby reducing or blocking vibration transmitted between the base and the cabinet to avoid the effect of the resonance.

Further, Japanese Patent No. 3171187 has disclosed a mechanism in which a charging time of applying voltage to an electro-mechanical conversion element is made equivalent to about one cycle of resonance frequency of the electro-mechanical conversion element and a discharging time is made equivalent to ½ cycle, namely, resonance is actively used, thereby increasing an elongation and contraction extent of the electro-mechanical conversion element to improve the driving efficiency of an actuator.

In addition, Japanese Patent No. 3171022 has disclosed a method for driving an actuator, with the effect of the resonance taken into account, in which the driving frequency f of the actuator is expressed by $f_1/3 \leq f \leq 2f_1/3$ where a driving member is fixed to one end of an electro-mechanical conversion element which is kept free and the other end is used as a fixed end to give the resonance frequency as $f_1$.

The mechanism disclosed in JP-A-2002-142470 is to avoid at least the effect of the resonance. Therefore, in the mechanism, the conditions are established for the resonance frequency of an actuator and the driving frequency of an electro-mechanical conversion element in a state that an adverse effect of resonance may develop, unless a base is elastically fixed to a cabinet. Further, since the mechanism disclosed in Japanese Patent No. 3171187 is to make an active utilization of resonance, in any case, there is a problem that an adverse effect by resonance inside an actuator results in displacement of a driving member in a direction other than the elongating and contracting direction of a piezoelectric element. For example, as shown in FIG. 17A and FIG. 17B, such a problem is posed that a driving member 2 is influenced by the resonance to displace in a direction other than the elongating and contracting direction of the piezoelectric element. Therefore, a driving force by the elongation and contraction of the piezoelectric element 1 is not accurately transmitted to a driven member 3, thereby making it difficult to accurately move the driven member 3 in the elongating and contracting direction of the piezoelectric element 1.

Further, in the mechanism disclosed in Japanese Patent No. 3171022 where it is desirable that a constitution system including a cabinet has a resonance frequency higher than a driving frequency, components such as a piezoelectric element and a driving member are made more rigid or individual members are coupled more rigidly to increase the resonance frequency. It is indispensable to make more rigid all the components including the cabinet, which results in a problem that a higher cost is needed in manufacturing the mechanism. There is another problem that according to the conditional expression disclosed in the above Document, since the driving frequency can be established only in a relatively narrow range (in the range shown in Q of FIG. 6B), the resonance frequency is decreased to be deviated from the condition and adversely influenced by resonance, when the mechanism has defects or varies in quality.

SUMMARY OF THE INVENTION

The present invention has been made in view of the above problems, an object thereof is to provide a driving mechanism capable of reducing the effect of the resonance and providing an accurate and stable driving control by obtaining a more appropriate relationship between the resonance frequency and the driving frequency.

In order to provide the above object, according to a first aspect of the invention, there is provided a driving mechanism comprising: (i) an actuator comprising: an electro-mechanical conversion element; a driving member which is connected to one end of the electro-mechanical conversion element and moves according to elongation or contraction of the electro-mechanical conversion element; and a weight member provided on the other end of the electro-mechanical conversion element; (ii) a driven member frictionally engaged with the driving member; and (iii) a driving circuit that drives the actuator, wherein the actuator allows the driven member to move along the driving member, and the driving circuit drives the electro-mechanical conversion element at a driving frequency f which gives $f \geq 2^{1/2} \cdot f_0$ when resonance frequency of a 1-freedom system is $f_0$ in which the electro-mechanical conversion element and the driving member are designated as a mass and the weight member is designated as a spring, and driving frequency of the electro-mechanical conversion element is f.

According to the first aspect of the invention, the electro-mechanical conversion element is driven at the thus established driving frequency f, thereby making it possible to drive and control the driven member accurately in the elongating and contracting direction of the electro-mechanical conversion element, with the effect of the resonance kept to quite a small extent.

Further, according to the first aspect of the invention, the driving frequency can be established at a wider range. Therefore, it is not necessary to change the establishment of the driving frequency, even in a case where the resonance frequency is changed due to environmental factors such as a change in temperatures and variation in products.

According to a second aspect of the invention, there is provided a driving mechanism as set forth in the first aspect of the invention, wherein the resonance frequency $f_0$ satisfies $f_0 \leq 70$ kHz.

According to a third aspect of the invention, there is provided a driving mechanism as set forth in the first or second aspect of the invention, wherein a material of the weight member is smaller in Young's modulus than a material of the electro-mechanical conversion element.

According to a fourth aspect of the invention, there is provided a driving mechanism as set forth in any of the first to third aspects of the invention, wherein a material of the weight member is 1 GPa or lower in Young's modulus.

The Young's modulus of the weight member is established as described above, thereby making it possible to reduce the resonance frequency and also to prevent the development of resonance in a driving frequency range. The Young's modulus of the weight member is preferably 1 GPa or lower and more preferably 300 MPa or lower.

According to a fifth aspect of the invention, there is provided a driving mechanism as set forth in any of the first to fourth aspects of the invention, wherein the weight member is a resonance frequency-reducing member that reduces the resonance frequency of the actuator.

According to a sixth aspect of the invention, there is provided a driving mechanism as set forth in any of the first to fifth aspects of the invention, wherein the weight member is the resonance frequency-reducing member, to reduce the resonance frequency of the actuator to a greater extent than a case where a weight member is a rigid material.

According to a seventh aspect of the invention, there is provided a driving mechanism as set forth in any of the first to sixth aspects of the invention, wherein the driving member is supported on at least one of its leading end side and its base end side, so as to move in elongating and contracting directions of the electro-mechanical conversion element.

According to an eighth aspect of the invention, there is provided a driving mechanism as set forth in any of the first to seventh aspects of the invention, further comprising a cabinet, wherein the actuator is supported laterally to the cabinet in elongating and contracting directions of the electro-mechanical conversion element.

According to a ninth aspect of the invention, there is provided a driving mechanism as set forth in any of the first to eighth aspects of the invention, further comprising a driving section that generates asymmetrical signals in elongating and contracting directions so as to drive the electro-mechanical conversion element.

According to a tenth aspect of the invention, there is provided a driving mechanism as set forth in any of the first to ninth aspects of the invention, wherein the driven member is in surface contact with the driving member.

According to an eleventh aspect of the invention, there is provided a driving mechanism as set forth in any of the first to tenth aspects of the invention, further comprising a detecting section that detects a movement position of the driven member.

According to a twelfth aspect of the invention, there is provided a driving mechanism as set forth in any of the first to eleventh aspects of the invention, wherein the electro-mechanical conversion element is driven at a driving frequency exceeding an audible frequency. In this instance, it is possible to reduce a driving sound in an audible region of the electro-mechanical conversion element.

According to a thirteenth aspect of the invention, there is provided a driving mechanism as set forth in any of the first to twelfth aspects of the invention, wherein the driven member is connected to an optical member and used in a photographic optical system. In this instance, the optical member is not restricted only to a lens, and the driven member is also used in diaphragms, shutters, ND filters and the like.

According to a fourteenth aspect of the invention, there is provided a driving mechanism as set forth in any of the first to thirteenth aspects of the invention, wherein the actuator is used in a photographic optical system mounted on a cellular phone. In this instance, the actuator is not restricted only to a photographic optical system mounted on a cellular phone but may be used in relatively-small sized photographic optical systems such as a web camera and a small-sized digital camera.

BRIEF DESCRIPTION OF THE DRAWINGS

FIGS. 15A and 15B is a wave pattern view of output signals to be outputted from the driving circuit of FIG. 13;

FIG. 16 is a view showing a calculation example of the resonance frequency; and

DETAILED DESCRIPTION OF THE INVENTION

Hereinafter, a detailed explanation will be made for preferred embodiments of the driving mechanism, photographic mechanism and cellular phone in the present invention with reference to the attached drawings. In explaining the drawings, the same element is given the same symbol to omit an overlapping explanation.

Figure 1:
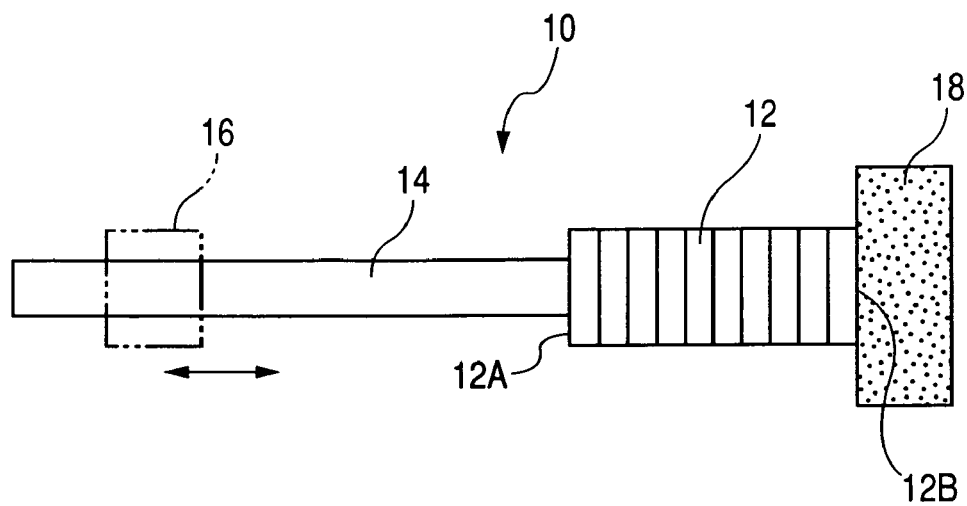
FIG. 1 is a plan view showing an actuator of a driving mechanism of a first embodiment in the present invention.

FIG. 1 is a plan view showing an actuator 10 of a driving mechanism 100 of a first embodiment in the present invention. As shown in FIG. 1, the actuator 10 is constituted by a piezoelectric element (corresponding to an electro-mechanical conversion element) 12, a driving member 14 and a weight member 18. The piezoelectric element 12 is laminated in the direction shown by the arrow and constituted so as to deform in a laminated direction (elongation and contraction) on application of voltage. Therefore, the piezoelectric element 12 is designed so that longer end surfaces 12A and 12B are displaced.

Of the end surfaces 12A and 12B of the piezoelectric element 12, to one end surface 12A is fastened a base end of the driving member 14. The driving member 14 is formed, for example, in a cylindrical shape, and its axis is arranged in the direction shown by the arrow (namely, in the elongating and contracting direction of the piezoelectric element). The driving member 14 is preferably made with a light and high rigid material. Beryllium is an ideal and eligible substance for this purpose. However, it is a rare metal and disadvantageous in that it is high in price and poor in workability. Then, in the present embodiment, a graphite composite in which graphite crystals are rigidly compounded, for example, carbon graphite, is used (in this instance, the graphite composite means a composite composed of graphite, as a hexagonal plate crystal of carbon, with substances other than graphite, the carbon graphite means a substance composed of graphite and amorphous carbon, and graphite is also called black lead). Carbon graphite which is one type of the graphite composite is advantageous in that it is similar to beryllium in characteristics (specific gravity of beryllium is about 1.85 and that of carbon graphite is about 1.8) but relatively inexpensive and better in workability unlike beryllium. Therefore, the cost of the actuator 10 can be reduced. The driving member 14 is not restricted in configuration to a cylindrical shape but may be available in a rectangular shape.

A driven member 16 is engaged with a driving member 14 at a predetermined friction and supported so as to slide along the driving member 14. Friction between the driven member 16 and the driving member 14 is provided in a state that, on application of a gradually changing voltage to a piezoelectric element 12, the static friction is greater than the driving force and, on application of an abruptly changing voltage to the piezoelectric element 12, the static friction is smaller than the driving force. It is noted that a lubricant is applied to an area where the driving member 14 slides to be in contact with the driven member 16, thereby making the movement stable and also improving the durability on a repeated driving. It is preferable that the lubricant is not affected for the performance by temperatures so as not to increase a sliding and driving resistance of the driving member 14 with the driven member 16. It is also preferable that the lubricant will not produce dust and the like which may affect optical components or mechanical components.

A weight member 18 is fastened to an end surface 12B of a piezoelectric element 12. The weight member 18 gives a load to the end surface 12B of the piezoelectric element 12, thereby preventing the end surface 12B from undergoing a greater displacement than the end surface 12A. The weight member 18 is preferably heavier than a driving member 14. Further, the weight member 18 whose mass is greater than that of the driving member 14 is provided, thereby making it possible to effectively transmit the elongation and contraction of the piezoelectric element 12 to the driving member 14. For example, where the driving member 14 is 8 mg and the piezoelectric element 12 is 30 mg, the weight member 18 of 20 mg is used.

Further, the weight member 18 is made with a soft material. The weight member 18 is made with a material whose Young's modulus is smaller than that of the piezoelectric element 12 and that of the driving member 14. The Young's modulus of the weight member 18 is preferably 1 GPa or lower, and more preferably 300 MPa or lower. The above-described weight member 18 is made by mixing an elastic body such as rubber with metal powder having a greater specific gravity. It is manufactured, for example, by mixing urethane rubber and urethane resin with tungsten powders. The specific gravity of the weight member 18 is preferably as high as possible for miniaturizing a mechanism, and established to be from 8 to 12, for example. Further, the weight member 18 prepared by mixing urethane rubber or urethane resin with tungsten powders is about 60 MPa in Young's modulus and about 11.7 in specific gravity. Therefore, where the weight member 18 is designed to be as small as possible in volume, optimal substances to be used together are those having the specific gravity as great as possible and the Young's modulus as small as possible. Any substance is usable as the weight member 18, as long as it is greater in specific gravity than the driving member 14 (the specific gravity of 1.8 or greater) and 1 GPa or lower in Young's modulus. More specifically, if a substance has a value obtained by dividing the specific gravity by Young's modulus (specific gravity/Young's modulus) of $1.8 \times 10^{-9}$ or greater, it is suitable as the weight member 18.

Figure 2A:
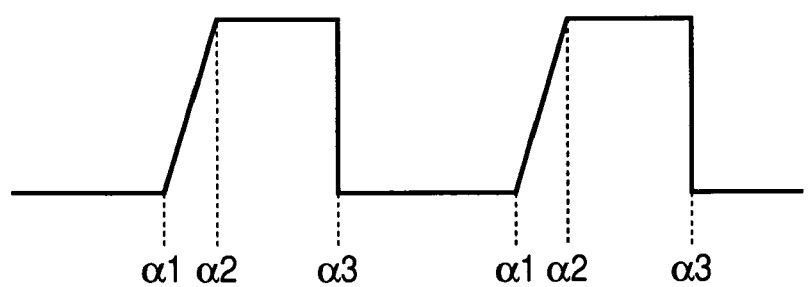
FIGS. 2A and 2B are wave pattern views showing a driving pulse applied to a piezoelectric element.
Figure 2B:
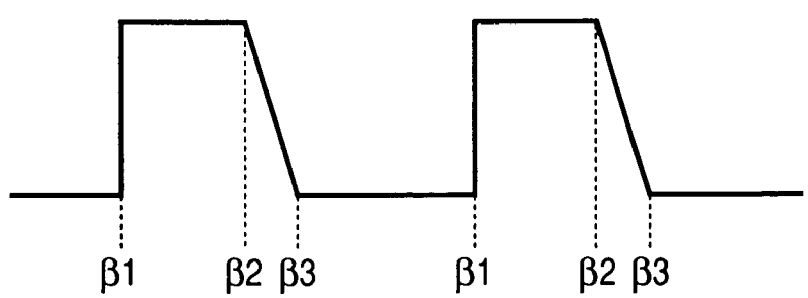

A driving-pulse supplying device (driving section) 26 (refer to FIG. 4) is electrically connected to the piezoelectric element 12. Voltage, the wave pattern of which is shown in FIG. 2A and FIG. 2B is applied by the driving-pulse supplying device 26. A signal, the frequency of which exceeds an audible frequency, is used as an output signal of FIGS. 2A and 2B, namely, an electric signal for driving the piezoelectric element 12. The signal with the above-described frequency is used to reduce a driving sound in the audible frequency region of the piezoelectric element 12. It is noted that the signal with the frequency exceeding the audible frequency is also used in the embodiments to be described later.

FIG. 2A and FIG. 2B show one example of a pulse wave pattern applied to the piezoelectric element 12. FIG. 2A shows a pulse wave pattern found when the driven member 16 of FIG. 1 is moved to the left as given by the arrow, and FIG. 2B shows a pulse wave pattern found when the driven member 16 of FIG. 1 is moved to the right as given by the arrow.

As shown in FIG. 2A, an approximately serrate driving pulse which rises gradually from a time $\alpha1$ to a time $\alpha2$ and falls abruptly at a time $\alpha3$ is applied to a piezoelectric element 12. Therefore, from the $\alpha1$ to the time $\alpha2$, the piezoelectric element 12 is gradually elongated. In this instance, since a driving member 14 moves slowly, a driven member 16 moves together with the driving member 14. Thereby, the driven member 16 is allowed to move to the left as shown in FIG. 1. Since the piezoelectric element 12 is abruptly contracted at the time $\alpha3$, the driving member 14 moves to the right as shown in FIG. 1. In this instance, an abrupt movement of the driving member 14 allows the driving member 14 alone to move, while the driven member 16 is kept halted at the position concerned due to inertia. Since the driven member 16 given in FIG. 1 repeats the movement and the halt to the left by a repeated application of the serrate driving pulse shown in FIG. 2A, it is allowed to move to the left.

Figure 13:
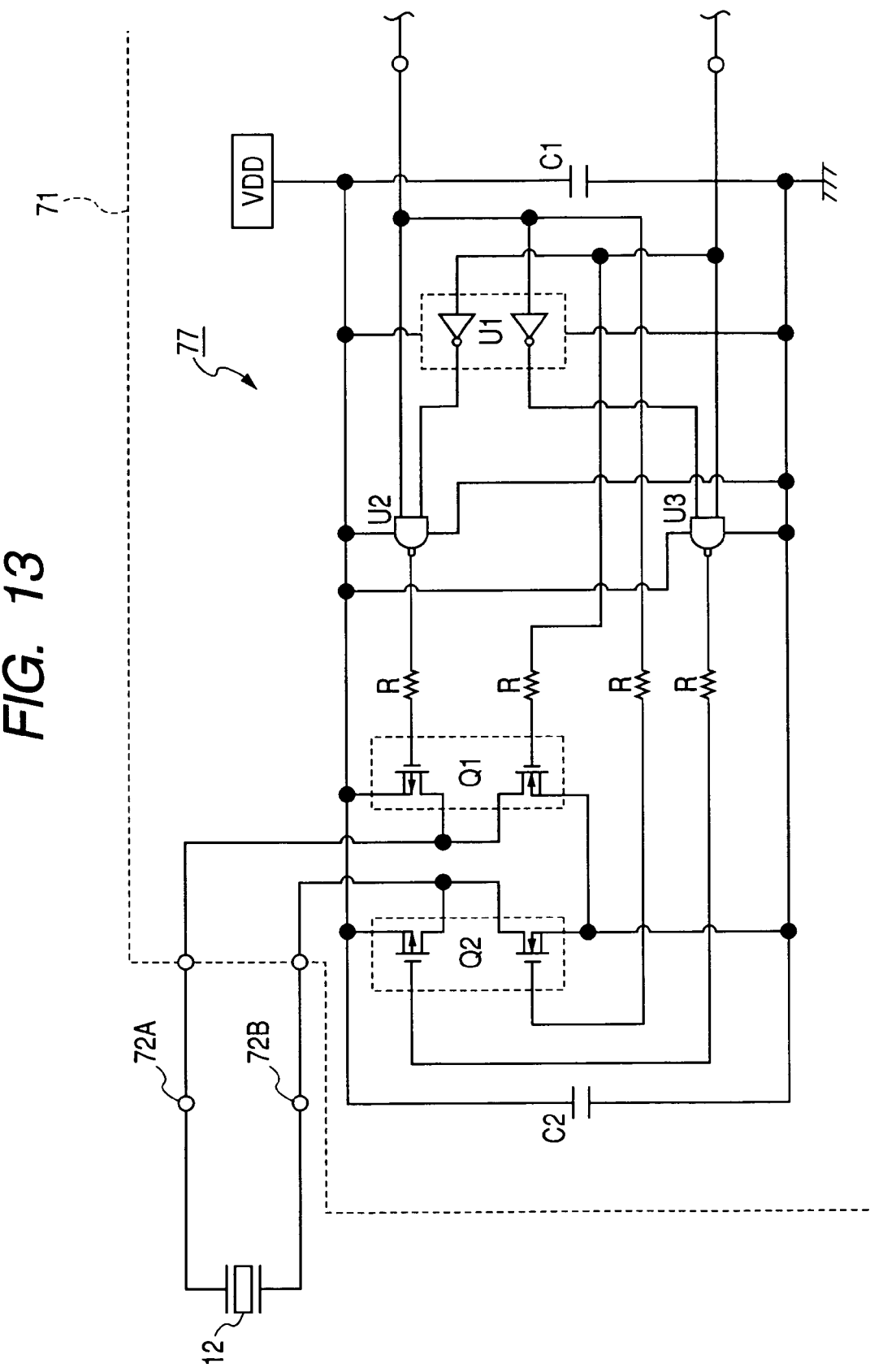
FIG. 13 is a circuit diagram showing the driving circuit of the driving mechanism in FIG. 11.

As shown in FIG. 2B, an approximately serrate driving pulse which rises abruptly at a time β1 and falls gradually from a time β2 to a time β3 is applied to a piezoelectric element 12. Therefore, at the time β1 the piezoelectric element 12 is abruptly elongated, and the driving member 14 moves to the left as shown in FIG. 1. In this instance, an abrupt movement of the driving member 14 allows the driving member 14 alone to move, while the driven member 16 is kept halted at the position concerned due to inertia. At the time β2 to the time β3, the piezoelectric element 12 is gradually contracted. At this moment, since the driving member 14 is gradually displaced, the driven member 16 moves together with the driving member 14. Thereby, the driven member 16 is allowed to move to the right as shown in FIG. 1. Since the driven member 16 of FIG. 1 repeats the movement and the halt to the right by a repeated application of the serrate driving pulse shown in FIG. 2B, it is allowed to move to the right. It is noted that the above-described serrate driving pulse is used as an example for explanation, and actually, a circuit as shown in FIG. 13 is used to input and output signals shown in FIGS. 14A and 14B and FIGS. 15A and 15B. The output signal is equivalent to the serrate driving pulse. Further, it is preferable to use a driving frequency in the range from 20 to 200 kHz, if selection is made to consider that an audible frequency region where the driving frequency is recognized as abnormal noise is avoided and that an electric consumption is small. It is more preferable to use the driving frequency in the range from 50 to 100 kHz.

In general, in order to prevent the transmission of vibration from vibrating machinery or buildings to the supporting foundation or the floor, it is better that they are smaller in vibration transmissibility. In the equivalent-1 freedom system, the vibration transmissibility is expressed by the following formula (1).

$$\lambda = \sqrt{\frac{1 + \left(2\zeta \frac{f}{f_0}\right)^2}{\left(1 + \left(\frac{f}{f_0}\right)^2\right)^2 + \left(2\zeta \frac{f}{f_0}\right)^2}} \quad \text{[Formula 1]}$$

Figure 6A:
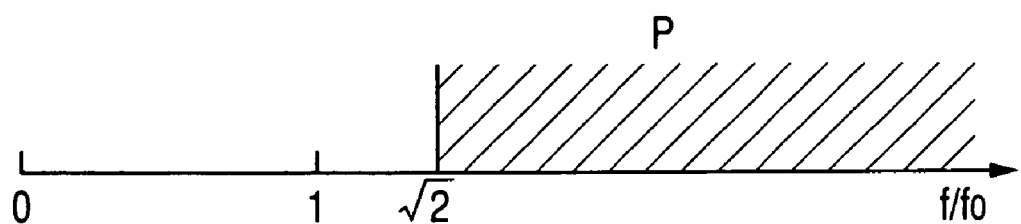
FIGS. 6A and 6B are views explaining the driving frequency region in relation to the resonance frequency.
Figure 6B:

The following symbols mean the following:

λ: vibration transmissibility of equivalent-1 freedom system f: driving frequency to be used $f_0$: resonance frequency of equivalent-1 freedom system ζ: attenuation ratio of equivalent-1 freedom system In the equivalent-1 freedom system, the vibration transmissibility λ of which is in the range of 1 or lower, less mechanical vibration is transmitted to the foundation or floor irrespective of the value ζ. Therefore, as shown in the following formula (2) and the formula (3), which is a modification of the formula (2), when the vibration transmissibility λ is in the range of 1 or lower, namely, in a range which satisfies the relationship of $f \geq 2^{1/2} \cdot f_0$ (range P in FIG. 6A), vibration of the piezoelectric element 12 is hardly transmitted to a support member of the actuator 10 (for example, body 20 in FIG. 4). This range is a vibration-isolating range where the effect of the resonance is quite small. The vibration-isolating range is described, for example, in "Introduction of Mode Analysis" authored by Akio Nagamatsu, issued by Corona Corporation. Obviously, the relationship of $f \geq 2^{1/2} \cdot f_0$ is also applicable to other embodiments.

$$1 \geq \lambda = \sqrt{\frac{1 + \left(2\zeta \frac{f}{f_0}\right)^2}{\left(1 + \left(\frac{f}{f_0}\right)^2\right)^2 + \left(2\zeta \frac{f}{f_0}\right)^2}} \quad \text{[Formula 2]}$$

$$f \geq 2^{\frac{1}{2}} \cdot f_0 \quad \text{[Formula 3]}$$

A driving pulse supplying device 26 applies the above-described pulse-form voltage to a piezoelectric element 12 at a specific driving frequency f. In other words, the piezoelectric element 12 is driven at a driving frequency f which gives $f \geq 2^{1/2} \cdot f_0$ when the resonance frequency of an equivalent 1-freedom system is $f_0$ in which the electro-mechanical conversion element 12 and the driving member 14 are designated as a mass and the weight member 18 is designated as a spring and the driving frequency of the electro-mechanical conversion element 12 is f. It is noted that the resonance frequency $f_0$ is obtained by the formula below. In this formula, E denotes Young's modulus of the weight member 18; A, area of the piezoelectric element 12 of the weight member 18; h, thickness of the weight member 18; Ma, mass of the piezoelectric element 12; Mb, mass of the driving member 14, and Mc, mass of the weight member 18.

$$f_0 = \frac{1}{2\pi}\sqrt{\frac{EA}{\left(Ma + Mb + \frac{1}{3}Mc\right)h}} \quad \text{[Formula 4]}$$

Next, an explanation will be made for actions of the thus constituted actuator 10.

In the present embodiment, the piezoelectric element 12 is driven and controlled at a driving frequency f which satisfies a vibration-isolating range of $f \geq 2^{1/2} \cdot f_0$ with respect to the resonance frequency $f_0$. Therefore, according to the present embodiment, it is possible to prevent the driving member 14 from being deviated by resonance to a direction other than the elongating and contracting direction of the piezoelectric element 12. The driving member 14 is displaced to the elongating and contracting direction of the piezoelectric element 12, thereby making it possible to transmit accurately a driving force derived from the elongation and contraction of the piezoelectric element 12 to the driven member 16. It is, therefore, possible to drive and control accurately the driven member 16 in the elongating and contracting direction of the piezoelectric element 12.

Further, according to the present invention, it is possible to establish the driving frequency f of the actuator 10 in such a wide range of $f \geq 2^{1/2} \cdot f_0$. Therefore, it is not necessary to change the establishment of the driving frequency f, even in a case where the resonance frequency $f_0$ is changed due to environmental factors such as change in temperatures and variation in products. It is not necessary either to change the establishment for every actuator 10.

In addition, in the present embodiment, a weight member 18 fastened to the end surface 12B of a piezoelectric element 12 is made with a soft material small in Young's modulus. Use of the thus made weight member 18 makes it possible to greatly reduce the resonance frequency $f_0$ of an equivalent 1-freedom system in which the piezoelectric element 12 and the driving member 14 are designated as a mass and the weight member 18 is designated as an elastic body. In other words, the weight member 18 functions as a resonance frequency-reducing member for reducing the resonance frequency. Further, use of the weight member 18 constituted by a soft material small in Young's modulus also makes it possible to decrease the resonance frequency of an actuator 10 to a greater extent than a case where a weight member constituted by a rigid material is provided. This fact is apparent from the above formula 1. More specifically, in the formula 1, when the Young's modulus E of the weight member 18 is made small, the resonance frequency $f_0$ is also made small. In the present embodiment, the Young's modulus of the weight member 18 is made to be 1 Gpa or lower, thereby making it possible to reduce the resonance frequency $f_0$ to about 70 kHz or lower. Further, in the present embodiment, when the Young's modulus of the weight member 18 is made to be 300 Mpa or lower, the resonance frequency $f_0$ is made to be 35 kHz or lower. In addition, in the present embodiment, where the weight member 18 is used which is prepared by mixing tungsten powders with urethane rubber whose Young's modulus is about 60 Mpa, the resonance frequency $f_0$ is made to be about 15 kHz. (Refer to the number 1 in FIG. 16. E+07 means $\times 10^7$.)

In contrast, where a member corresponding to a weight is made with a rigid material having a greater Young's modulus, the resonance frequency $f_0$ is made greater. For example, in the present embodiment, where a material of the weight member 18 is stainless steel whose Young's modulus is in the range of 200 to 400 Gpa, the resonance frequency $f_0$ is 1 GHz or greater. Further, even where aluminum is used whose Young's modulus is relatively small among metals (Young's modulus is about 120 GPa.), the resonance frequency $f_0$ is about 700 kHz. (Refer to the number 5 in FIG. 16.)

As described previously, in the actuator 10 of the present embodiment, since a weight member 18 is constituted by a resonance frequency-reducing member, it is possible to decrease the resonance frequency $f_0$ of an equivalent 1-freedom system to 70 kHz or lower. Then, a driving frequency f which is in an ordinary range of 50 to 100 kHz is able to satisfy the relationship of $f \geq 2^{1/2} \cdot f_0$. In other words, if not established in a high frequency range, the driving frequency f is able to satisfy the relationship $f \geq 2^{1/2} \cdot f_0$ and also to reduce the electric consumption without establishing the driving frequency at a high frequency wave. It is noted that a similar effect can be obtained, where the weight member 18 is made with an elastic body or a viscoelastic body.

Figure 3A:
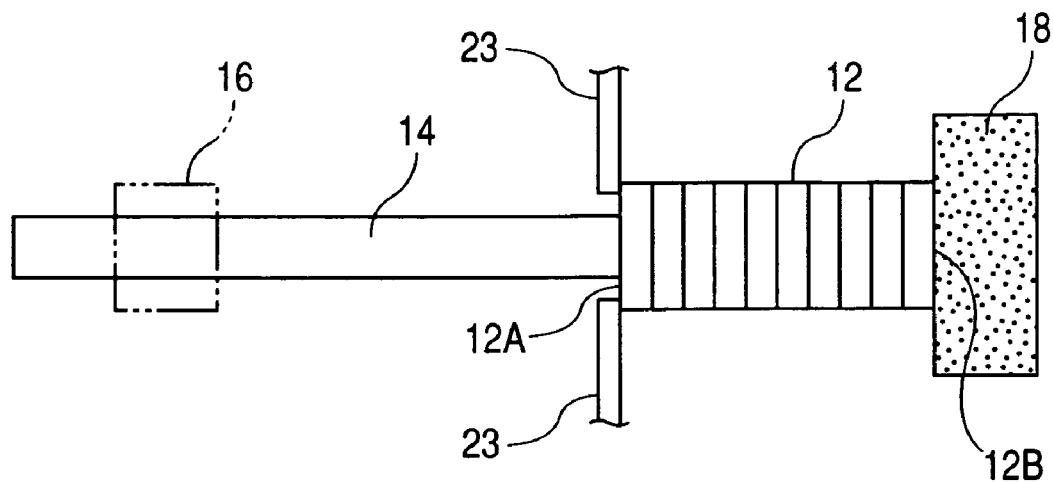
FIGS. 3A and 3B are pattern views showing a position of supporting the actuator given in FIG. 1.
Figure 3B:
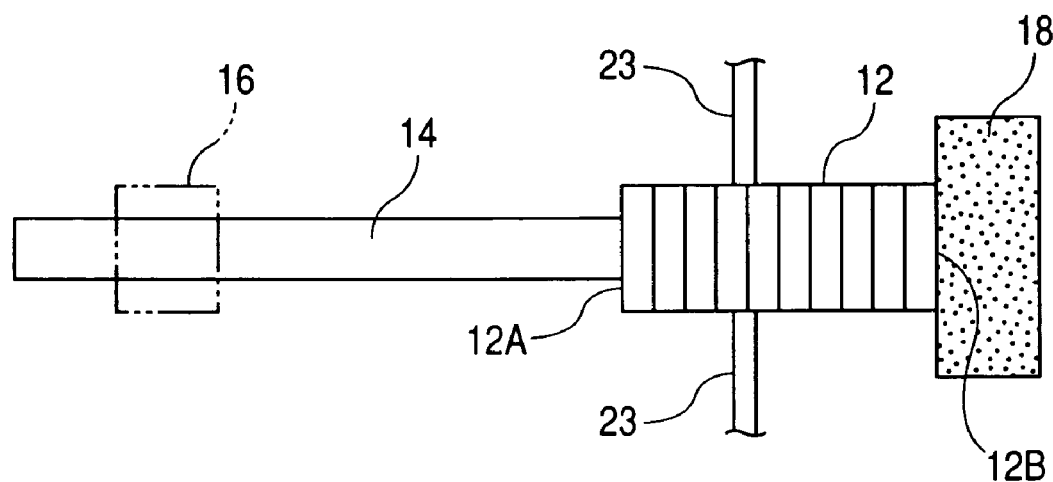

Further, according to the present embodiment, an actuator constituted by a piezoelectric element 12, a driving member 14 and a weight member 18 is made small in the resonance frequency $f_0$ itself, thereby making it possible to remove the adverse effect of resonance. Therefore, the actuator is less influenced by a constitutional variation in components and at the same time less influenced by resonance, irrespective of in which way the actuator is attached to a cabinet, thereby increasing the degree of freedom in terms of design and manufacture on attachment of the actuator. More specifically, as shown in FIG. 3A, the end surface 12A of the piezoelectric element 12 may be supported by a support member 23, or as shown in FIG. 3B, the side surface of the piezoelectric element 12 may be supported by the support member 23. Further, the driving member 14 may be supported on the leading end surface, the side surface, the leading end side and/or the base end side. The weight member 18 may be supported on the side surface or the rear end surface.

Figure 4:
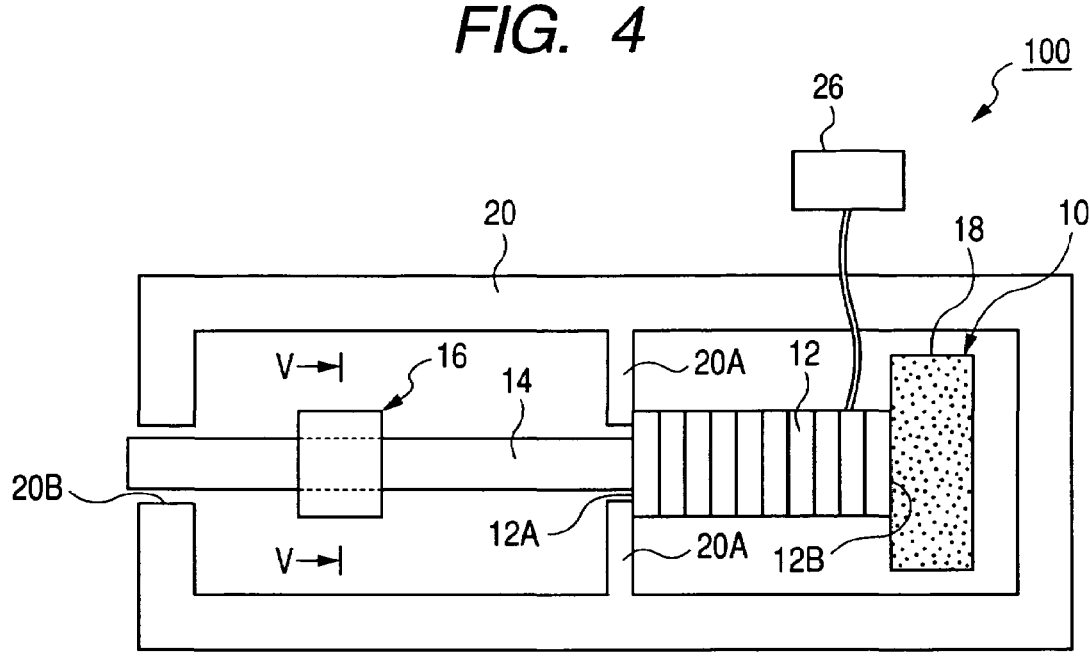
FIG. 4 is a plan view showing the driving mechanism of the first embodiment in the present invention.

FIG. 4 is a plan view showing a driving mechanism 100 of a first embodiment in the present invention. The driving mechanism 100 is used in a camera-equipped cellular phone in which an actuator 10 is loaded, and the actuator 10 is to move a zoom lens (not shown) such as a zoom lens and a focus lens.

The actuator 10 shown in FIG. 4 is supported by an end surface 12A of a piezoelectric element 12, as with the case shown in FIG. 3A. More specifically, the end surface 12A of the piezoelectric element 12 is adhered and fixed to a support portion 20A formed on a body (cabinet) 20.

A hole 20B is formed on the body 20. The hole 20B is formed to be slightly larger in outer diameter than that of a driving member 14, and the leading end of the driving member 14 is inserted through the hole 20B and supported.

Figure 5:
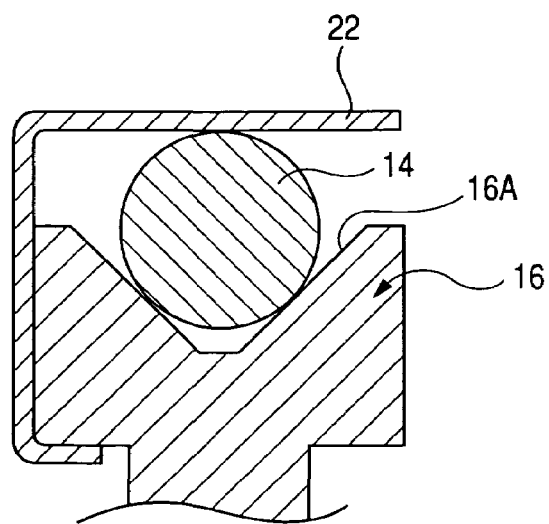
FIG. 5 is a sectional view taken along line V to V in FIG. 4.

As shown in FIG. 5, a driven member 16 is provided with a V-shaped groove 16A and a driving member 14 is engaged with the groove 16A. Further, a driven member 16 is provided with a blade spring 22 and the driving member 14 is urged to the driven member 16 by the blade spring 22. As described above, the driven member 16 is in line contact with the driving member 14 at three sites, and in practice it is in surface contact. Thereby, the driven member 16 is frictionally engaged with the driving member 14. Below the driven member 16 is connected a holding frame (not shown) for holding a zoom lens.

Even in the thus constituted case, the piezoelectric element 12 is driven at the driving frequency f which satisfies $f \geq 2^{1/2} \cdot f_0$, thereby making it possible to transmit accurately a driving force of the piezoelectric element 12 to the driven member 16 in the elongating and contracting direction.

Next, an explanation will be made for a driving mechanism 200 of a second embodiment in the present invention with reference to FIG. 7 and FIG. 8. Explanation will be omitted here that has already been made in the first embodiment and will be made about the points which are different therefrom.

Figure 7:
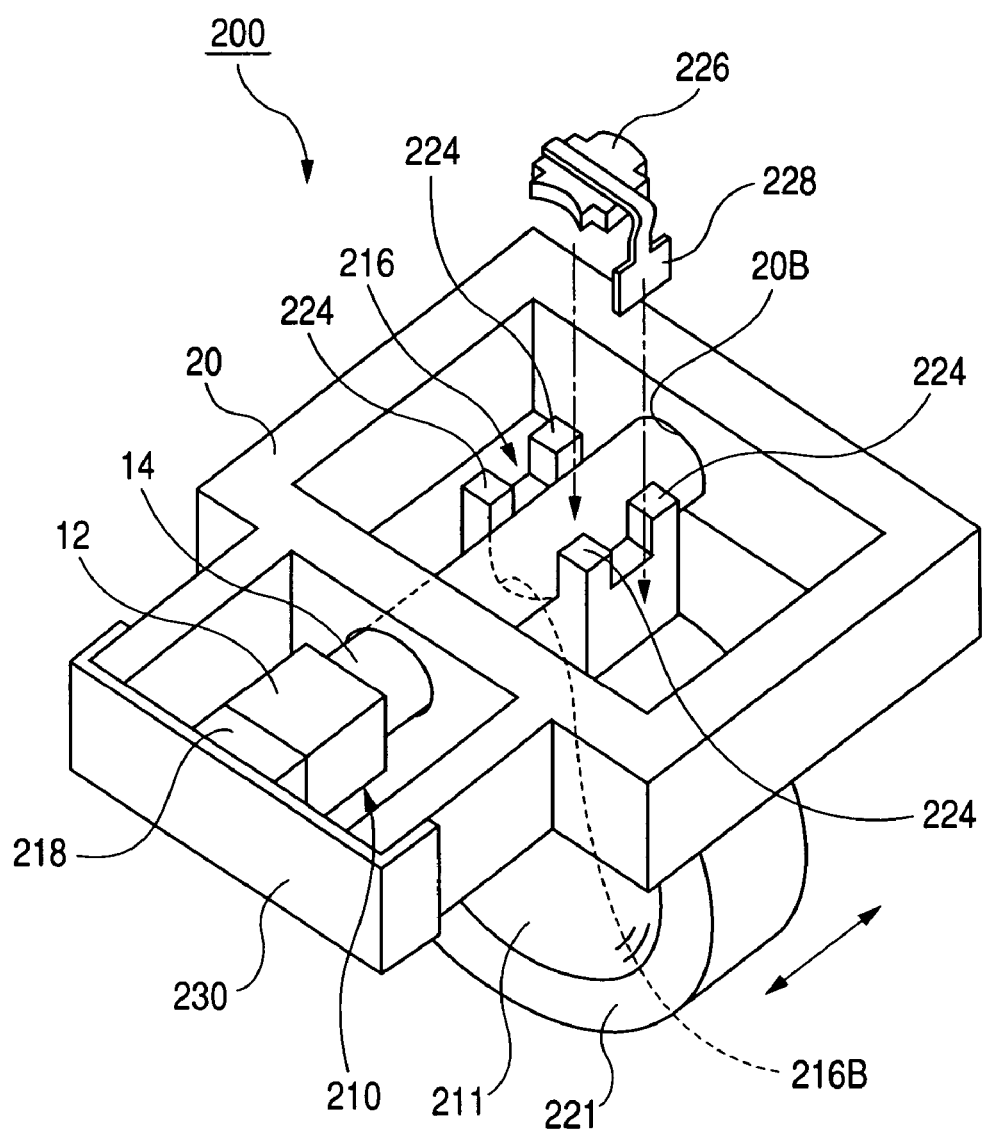
FIG. 7 is a perspective view showing a driving mechanism of a second embodiment in the present invention.
Figure 8:
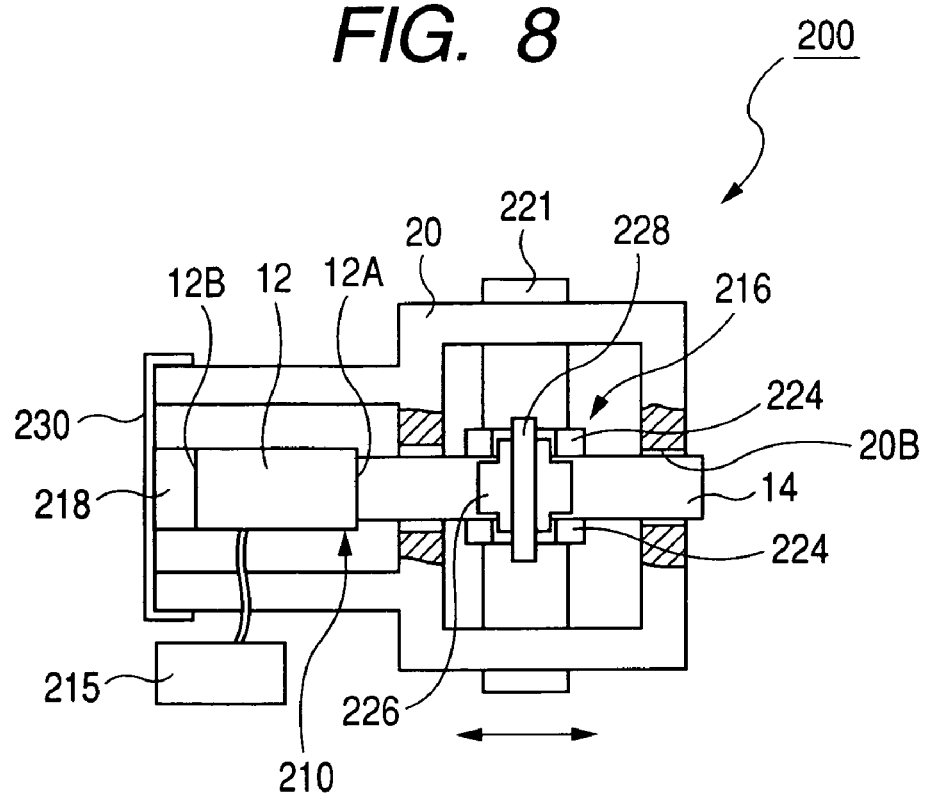
FIG. 8 is a plan view showing a driving mechanism in FIG. 7.

As shown in FIG. 7 and FIG. 8, the driving mechanism 200 is provided with an actuator 210. A driven member 216 is formed integrally with a lens frame 221 of a zoom lens 211. The lens frame 221 is guided by a guide bar (not shown) arranged in parallel with a driving member 14 to prevent rotation around the driving member 14. Further, a U-shaped groove 216B is formed in a driven member 216 and the driving member 14 is engaged with the groove 216B. Projections 224 and 224 . . . projecting upward are provided at each of the four corners of the driven member 216, and a friction plate 226 is provided at an area surrounded by the projections 224 and 224 . . . . The friction plate 226 is bent and formed in a circular shape in accordance with the side surface configuration of the driving member 14. Therefore, the driven member 216 is in surface contact with the driving member 14. Further, each corner of the friction plate 226 is notched in accordance with the projections 224 and 224 . . . of the driven member 216. Therefore, the friction plate 226 is arranged in an area surrounded by the projections 224 and 224 . . . to prevent removal of the friction plate 226.

A presser spring 228 is attached to the driven member 216. The presser spring 228 is constituted so as to urge the friction plate 226 to the driven member 216. Therefore, when the driving member 14 is arranged on the U-shaped groove 216B of the driven member 216 and the friction plate 226 is arranged thereon, the friction plate 226 is pressed to the driving member 14 by the presser spring 228, and the driving member 14 is held between the friction plate 226 and the driven member 216, thereby allowing the driven member 216 to be frictionally engaged with the driving member 14.

A soft weight member 218 is connected to the end surface 12B at the rear end of a piezoelectric element 12. The weight member 218 is preferably as high as possible in specific gravity, with miniaturization of the mechanism taken into account, and established to be, for example, in the same range with stainless steel (7.7 to 8.0). The weight member 218 is provided with a fitting 230 on a surface opposite a surface on which the piezoelectric element 12 is attached, and the weight member 218 is supported to a body 20 via the fitting 230. The fitting 230 is formed into a U shape by bending a metal plate, and the bent portions on both ends are fitted and fixed to the body 20. The piezoelectric element 12 is electrically connected to a driving pulse supplying device 215 (refer to FIG. 8), and the driving pulse supplying device 215 is used to apply a voltage to the piezoelectric element 12. Further, in the present embodiment, the weight member 218 is fixed to the body 20 via the fitting 230. However, the weight member 218 directly attached to the body 20 is also able to provide a similar effect.

In the above-described present embodiment, the end surface 12B at the rear end of a piezoelectric element 12 is supported by a soft weight member 218 in a state that it is practically kept free, thereby decreasing the resonance frequency $f_0$ to a range of 20 to 30 kHz. Then, a driving pulse supplying device 215 drives the piezoelectric element 12 at a driving frequency f which satisfies the relationship of $f \geq 2^{1/2} \cdot f_0$ with respect to the resonance frequency $f_0$. A range which satisfies the relationship of $f \geq 2^{1/2} \cdot f_0$ is a vibration-isolating range where force is transmitted at a rate of 1 or lower or no resonance will develop. Therefore, according to the present embodiment, it is possible to prevent resonance of the component system and also to secure a stable driving capacity constantly.

Next, an explanation will be made for a driving mechanism 300 of a third embodiment in the present invention with reference to FIG. 9.

Figure 9:
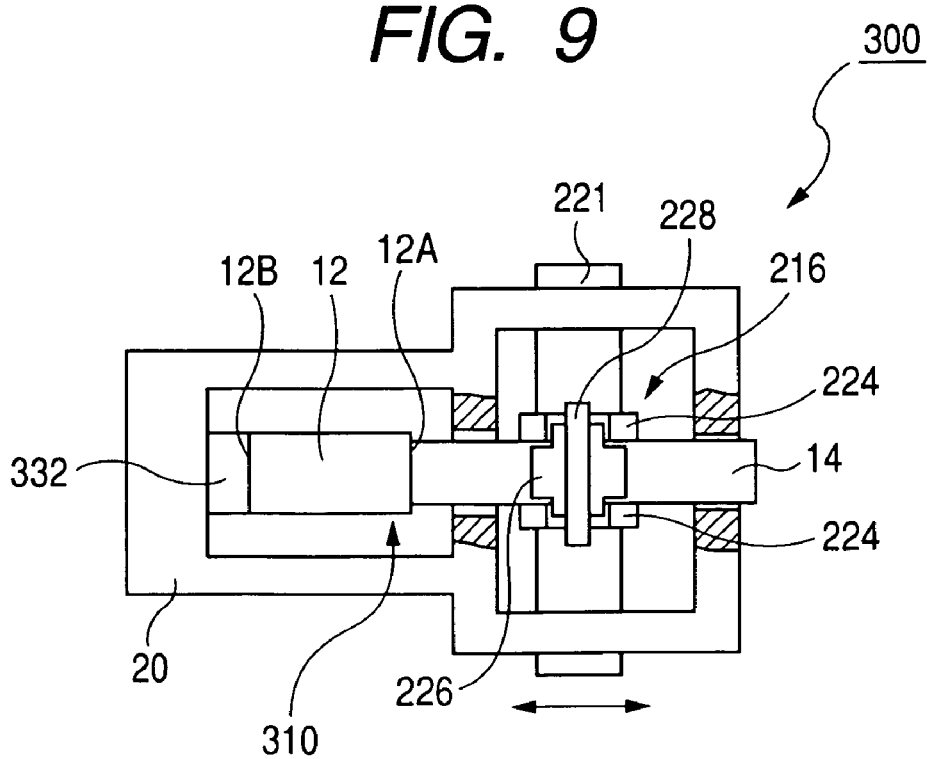
FIG. 9 is a plan view showing a driving mechanism of a third embodiment in the present invention.

As shown in FIG. 9, the driving mechanism 300 is different from the driving mechanism 200 in that a weight member 332 constituted by an elastic body such as rubber is adhered and fixed to the end surface 12B on the rear side of a piezoelectric element 12 and a surface opposite the piezoelectric element 12 in the weight member 332 is adhered and fixed to a body 20. The thus constituted mechanism is also able to secure a stable driving capacity constantly, as with the above embodiment.

Next, an explanation will be made for a driving mechanism 400 of a fourth embodiment in the present invention with reference to FIG. 10.

Figure 10:
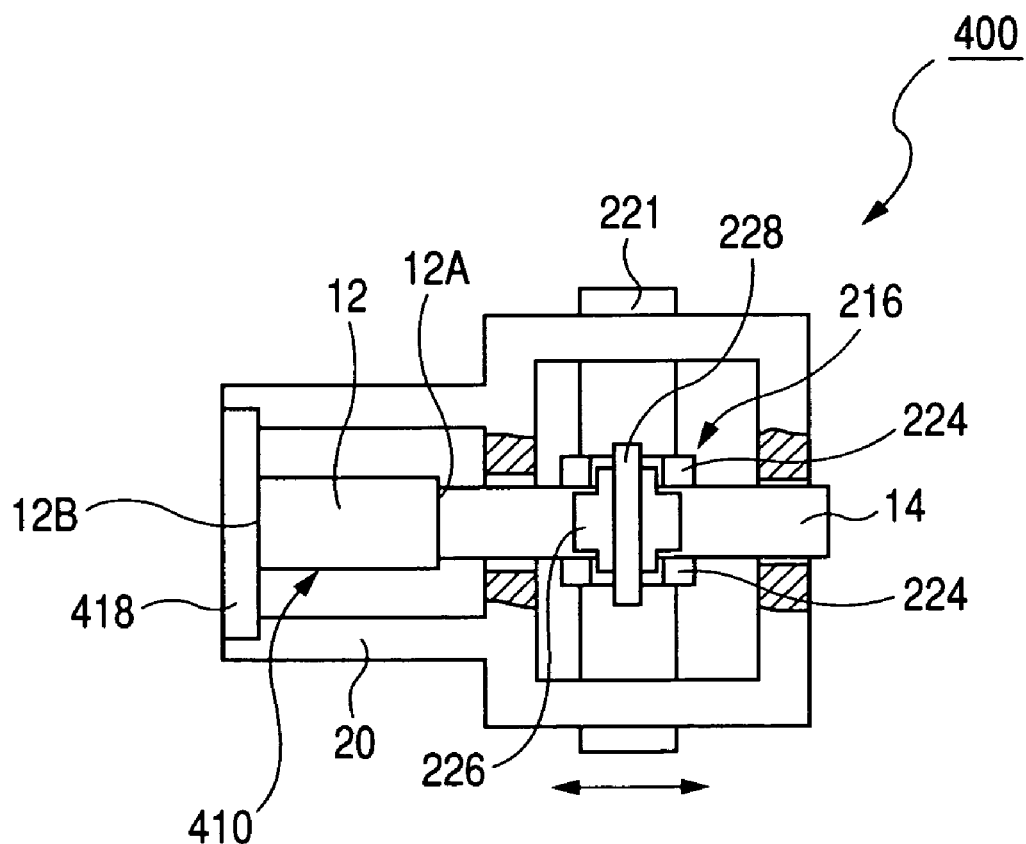
FIG. 10 is a plan view showing a driving mechanism of a fourth embodiment in the present invention.

As shown in FIG. 10, the driving mechanism 400 is different from the driving mechanism 200 in that a weight member 418 made with a soft material is shaped into a thin plate form having a larger surface than the end surface 12B of a piezoelectric element 12, the piezoelectric element 12 is adhered and fixed at the center of the weight member 418, and both ends of the weight member 418 are adhered and fixed to a body 20. Since the end surface 12B at the rear end of the piezoelectric element 12 is supported to the body 20 by the thin-plate shaped weight member 418, the weight member 418 is deformed flexibly to cause displacement on the end surface 12B at the rear end of the piezoelectric element 12. In addition, since the weight member 418 is small in Young's modulus, the end surface 12B at the rear end of the piezoelectric element 12 is supported in a state that it is practically kept free by the weight member 418. Therefore, the resonance frequency $f_0$ is allowed to be decreased and the driving frequency f is allowed to be used in a wider range of $f \geq 2^{1/2} \cdot f_0$, which is a vibration-isolating range. It is, therefore, possible to prevent resonance of the component system and also to provide a stable driving capacity constantly.

Further, via a viscoelastic body, it may be possible to support the end surface 12B of the rear end of the piezoelectric element 12. Thereby, resonance can be more effectively suppressed. In other words, elastic bodies such as resin and rubber are mostly viscous, and the viscosity will absorb vibration energy, convert it to heat and dissipate it. Therefore, it is possible to prevent adverse effects such as resonance by the component system and vibration caused in a direction other than a desired direction.

Next, an explanation will be made for a driving mechanism 500 of a fifth embodiment in the present invention.

Figure 11:
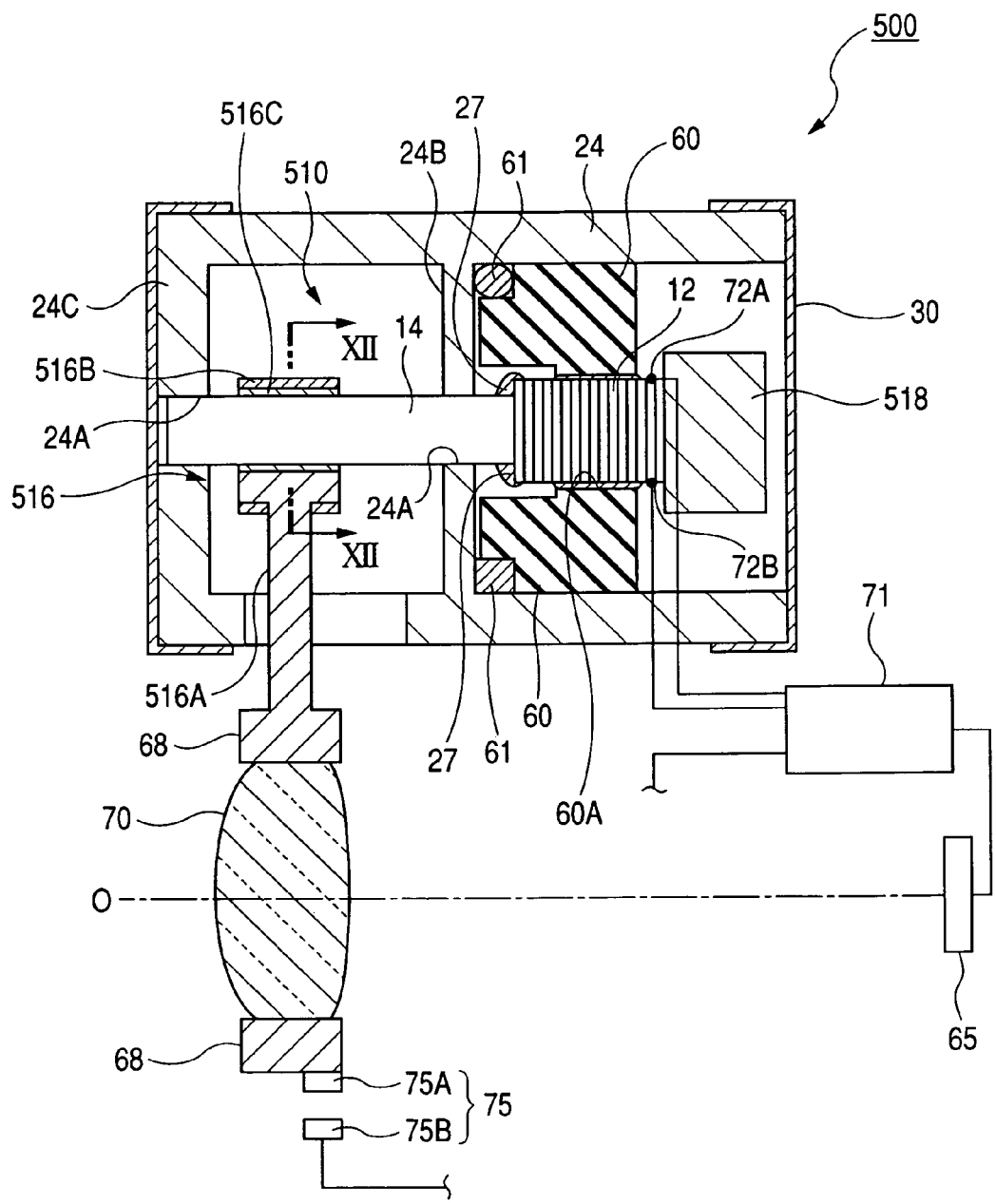
FIG. 11 is a plan view showing a driving mechanism of a fifth embodiment in the present invention.

FIG. 11 is a sectional view showing the driving mechanism 500 of the fifth embodiment in the present invention. As shown in FIG. 11, the driving mechanism 500 of the present embodiment is to drive a zoom lens 70, with the zoom lens 70 being taken as an object to be moved, and provided with an actuator 510 having a piezoelectric element 12 and a driving member 14, a support member 60 for supporting the actuator 510 and a driven member 516. The piezoelectric element 12 is an electro-mechanical conversion element which can be elongated and contracted by inputting electric signals and also elongated and contracted in a predetermined direction. The piezoelectric element 12 is connected to a controller 71 to undergo elongation and contraction when electric signals are inputted by the controller 71. The piezoelectric element 12 is provided, for example, with two input terminals 72A and 72B. Voltage applied to the input terminals 72A and 72B is repeatedly increased and decreased, thereby causing the piezoelectric element 12 to elongate and contract repeatedly.

A driving member 14 is attached to a piezoelectric element 12, with a longer side opposing the elongating and contracting direction of the piezoelectric element 12. For example, one end of the driving member 14 is in contact with the piezoelectric element 12 and adhered thereto by using an adhesive agent 27. The driving member 14 is a long member and, for example, a cylindrical-shaped member is used for this purpose. The driving member 14 is made with a graphite composite in which graphite crystals are rigidly compounded, for example, carbon graphite. The driving member 14 is supported by a partition portion 24B and a partition portion 24C extending inside from a body 24 so as to move along the longitudinal direction. The partition portion 24B and the partition portion 24C are members for partitioning the movement area of a driven member 516, and also function as a support member of the driving member 14.

Through holes 24A which are penetrated through the driving member 14 are formed respectively at the partition portion 24B and the partition portion 24C. The partition portion 24B supports the vicinity of an area for attaching the piezoelectric element 12 of the driving member 14, namely, a base end area of the driving member 14. The partition portion 24C supports a leading end area of the driving member 14. The body 24 functions as a frame or a frame member for assembling the actuator 510. The driving member 14 is attached to the piezoelectric element 12 to reciprocate along the longitudinal direction in accordance with the repeated movement of elongation and contraction by the piezoelectric element 12.

It is noted that FIG. 11 shows a case where the driving member 14 is supported at two points, namely on the leading end side and on the base end side by the partition portions 24B and 24C. There is also a case where the driving member 14 is supported either only on the leading end side or on the base end side. For example, the through hole 24A of the partition portion 24B is made larger in outer diameter than the driving member 14, by which the driving member 14 is supported by the partition portion 24C only at the leading end area. In addition, the through hole 24A of the partition portion 24C is made larger in outer diameter than the driving member 14, by which the driving member 14 is supported by the partition portion 24B only at the base end area. In addition, FIG. 11 shows a case where the partition portions 24B and 24C supporting the driving shaft 14 are integrally formed with a body 24. These partition portions 24B and 24C may be separately attached to the body 24. Even if attached separately, they are able to provide an effect and action similar to those obtained in the integral formation.

A driven member 516 is attached to a driving member 14 so as to make a movement. The driven member 516 is attached to the driving member 14 through a frictional engagement and allowed to move along the longitudinal direction. For example, the driven member 516 is engaged with the driving member 14 at a predetermined friction coefficient. The driven member 516 is pressed to the driving member 14 at a predetermined pressing force, by which it is attached so as to produce a certain frictional force on movement. Since a movement force which exceeds the frictional force is imparted to the driven member 516, the driven member 516 moves along the driving member 14 against the frictional force.

An actuator 510 is supported to a body 24 by a support member 60. The support member 60 is to support the actuator 510 in a direction orthogonal to the elongating and contracting direction of the piezoelectric element 12, and arranged between the body 24 for accommodating the actuator 510 and the piezoelectric element 12.

A support member 60 is made with an elastic body, which is more elastic than a predetermined level, and made, for example, with a silicone resin. The support member 60 is provided with an insertion hole 60A for inserting the piezoelectric element 12 and assembled to a body 24 in a state that the piezoelectric element 12 is inserted into the insertion hole 60A. The support member 60 is fastened to the body 24 by using an adhesive agent 61. The support member 60 is also fastened to the piezoelectric element 12 by using an adhesive agent. The support member 60 is made with an elastic body, thereby making it possible to support an actuator 510 so as to move in the elongating and contracting direction of the piezoelectric element 12. FIG. 11 shows two support members 60, namely, on both sides of the piezoelectric element 12. These two support members 60 and 60 are shown because they are viewed from the cross section of one continuous support member 60.

Further, the support member 60 may be fastened to a body 24 and to the piezoelectric element 12 by press-fitting the support member 60 into a space between the body 24 and the piezoelectric element 12 to press the support member 60. For example, the support member 60 is constituted by an elastic body and formed to be larger than a space between the body 24 and the piezoelectric element 12, into which the support member 60 is press-fitted. Thereby, the support member 60 is closely attached to the body 24 and the piezoelectric element 12, and duly placed. In this instance, the piezoelectric element 12 is pressed by the support member 60 on both sides in a direction orthogonal to the elongating and contracting direction, thereby supporting the actuator 510.

In this instance, an explanation was made for a case where the support member 60 was made with a silicone resin. The support member 60 may be constituted by a spring member. For example, the spring member is arranged between the body 24 and the piezoelectric element 12, thereby supporting the actuator 510 to the body 24.

A zoom lens 70 is attached via a lens frame 68 to the driven member 516. The zoom lens 70 is to constitute a photographic optical system of a camera and to be moved by a driving mechanism. The zoom lens 70 is integrally coupled to the driven member 516 and designed to move together with the driven member 516. A fixed lens (not shown) is placed on an optical axis O of the zoom lens 70 to constitute the photographic optical system of the camera. Further, an imaging device 65 is placed on the optical axis O. The imaging device 65 is an imaging section for converting an image formed by a photographic optical system to electric signals, and, for example, constituted by a CCD. The imaging device 65 is connected to a controller 71 to output image signals to the controller 71.

A weight member 518 is attached to the end of a piezoelectric element 12. The weight member 518 is a member for transmitting an elongating and contracting force of the piezoelectric element 12 to a driving member 14 and attached to the end of the opposing side of the end to which the driving member 14 of the piezoelectric element 12 is attached. A material which is heavier than the driving member 14 is used as the weight member 518. Further, it is preferable to use a material which is prepared by mixing metal powder with an elastically deformable member as the weight member 518. Mixture of the metal powder increases the weight, and use of the elastically deformable member makes it possible to attenuate an unnecessary resonance in driving the piezoelectric element 12. Further, when the weight member 518 is constituted by a soft member, the resonance frequency of the actuator 510 is made sufficiently smaller as compared with the driving frequency of the piezoelectric element 12, thereby reducing the effect of the resonance.

Further, the weight member 518 is provided in a state that it is not supported or fixed to a body 24. More specifically, the weight member 518 is not directly supported or fixed to the body 24. In other words, the weight member 518 is provided so as not to be supported or fixed for restricting the movement of the body 24 via an adhesive agent or a resin material.

A driving mechanism 500 is provided with a detector 75 for detecting the movement position of a driven member 516. The detector 75 includes, for example, optical detectors such as a photo reflector and a photo interrupter. More specifically, where the detector 75 provided with a reflector 75A and a detecting portion 75 B is used, the reflector 75A is attached to a lens frame 68 which is integrally formed with the driven member 516 to emit a detection light from the detecting portion 75B to the reflector 75A, and the light reflected on the reflector 75A is detected at the detecting portion 75B, thereby detecting movement positions of the driven member 516 and the zoom lens 70.

The detector 75 is connected to a controller 71. Output signals of the detector 75 are inputted into the controller 71. The controller 71 performs the control of a driving mechanism, and constituted by, for example, a CPU, a ROM, a RAM, an input signal circuit and an output signal circuit. Further, the controller 71 is provided with a driving circuit for driving a piezoelectric element 12 and outputting electric signals for driving the piezoelectric element 12.

Figure 12:
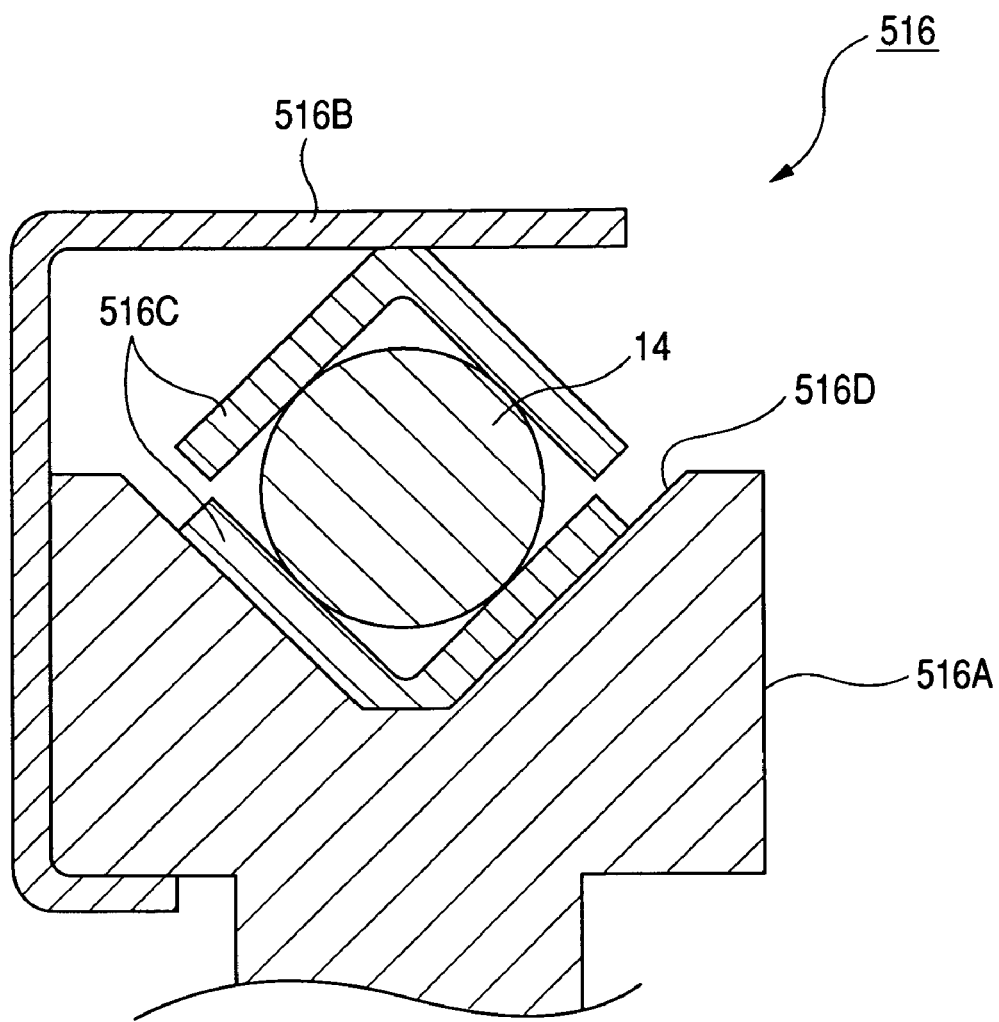
FIG. 12 is a sectional view taken along line XII to XII in FIG. 11.

FIG. 12 is a sectional view of the driven member 516 taken along line XII to XII in FIG. 11. As shown in FIG. 12, the driven member 516 is provided, for example, with a body 516A, a pressing portion 516B and a sliding portion 516C.

The body 516A is pressed to a driving member 14 at a certain force by the pressing portion 516B. The body 516A is provided with a V-shaped groove 516D. The driving member 14 is accommodated inside the groove 516D in a state that it is held between two sliding portions 516C and 516C. The sliding portions 516C and 516C are a plate having a V shaped-cross section and arranged so that their recessed portions are opposed to each other. They are provided behind the driving member 14. The driving member 14 is accommodated inside the V-shaped groove 516D, thereby making it possible to attach the driven member 516 to the driving member 14 in a stable manner.

A material, for example, a blade spring having the L-shaped cross section, is used as the pressing portion 516B. One side of the pressing portion 516B is hooked on the body 516A and the other side is placed at a position opposed to the groove 516D, by which the other side is used to hold the driving member 14 accommodated in the groove 516D between the body 516A and the sliding portion 516C. Thereby, the body 516A is allowed to be pressed to the driving member 14 side.

As described above, the driven member 516 is attached by pressing the body 516A to the driving member 14 at a certain force via the pressing portion 516B, thereby frictionally being engaged with the driving member 14. More specifically, the driven member 516 is attached so that the body 516A and the pressing portion 516B are pressed at a certain pressing force to the driving member 14 to generate a certain frictional force on movement.

Further, since the driving member 14 is held between the sliding portions 516C and 516C having a V-shaped cross section, the driven member 516 is in line contact with the driving member 14 at four points, or in surface contact, in practice, thereby making a frictional engagement with the driving member 14 in a stable manner.

FIG. 13 is a circuit diagram of a driving circuit which drives a piezoelectric element 12. As shown in FIG. 13, a driving circuit 77 is provided inside a controller 71. The driving circuit 77 functions as a drive circuit of the piezoelectric element 12, outputting a driving electric signal to the piezoelectric element 12. The driving circuit 77 inputs a control signal from a control signal generating portion (not shown) of the controller 71 to amplify the voltage or the current of the signals, thereby outputting the driving electric signal for the piezoelectric element 12. In the driving circuit 77, an input section is constituted, for example, with logical circuits U1 to U3, and an output section is provided with field-effect transistors (FET) Q1 and Q2. The transistors Q1 and Q2 are constituted so as to output an H output (high potential output), an L output (low potential output) and an OFF output (open output) as output signals.

Figure 14A:
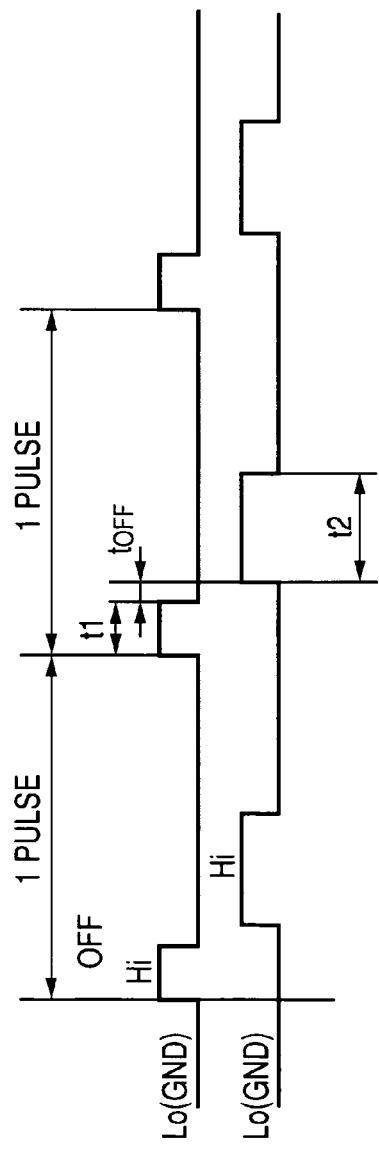
FIGS. 14A and 14B are wave pattern views of input signals to be inputted to the driving circuit of FIG. 13.
Figure 14B:
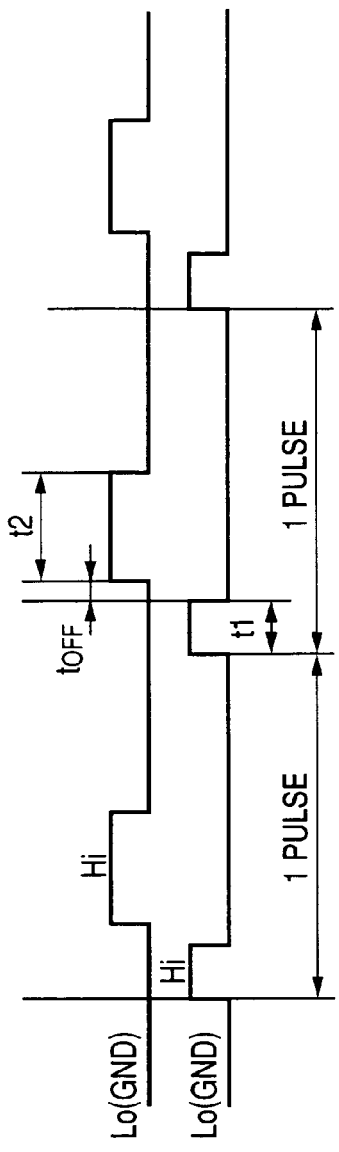
Figure 17A:
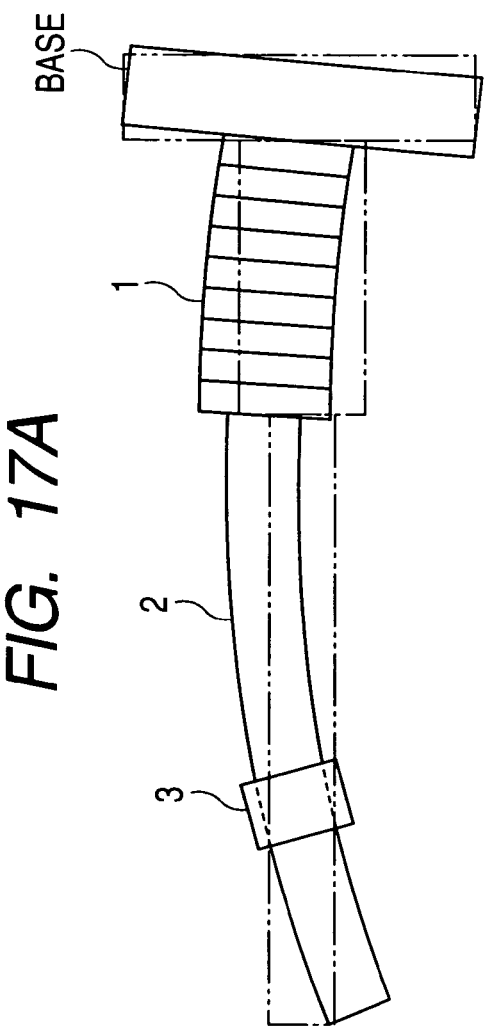
FIGS. 17A and 17B are views explaining defects found in the related-art actuator.
Figure 17B:
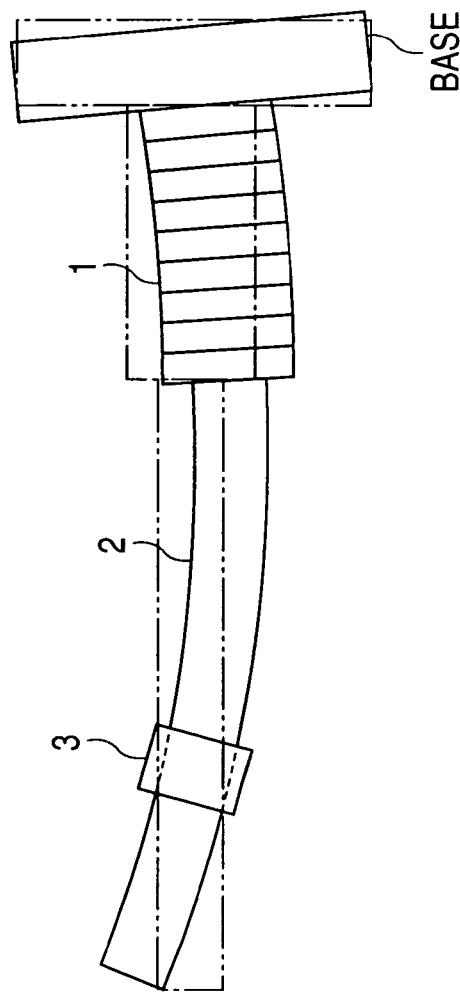

FIGS. 14A and 14B show the input signal to be inputted into the driving circuit 77, and FIGS. 15A and 15B show the output signal to be outputted from the driving circuit 77. FIG. 14A shows the input signal to be inputted when the driven member 516 is moved to a direction which is in access to the piezoelectric element 12 (right direction in FIG. 11). FIG. 14B is the input signal to be inputted when the driven member 516 is moved to a direction which is spaced apart from the piezoelectric element 12 (left direction in FIG. 11). Further, FIG. 15A is the output signal to be outputted when the driven member 516 is moved to a direction which is in access to the piezoelectric element 12 (right direction in FIG. 11) and FIG. 15B is the output signal to be outputted when the driven member 516 is moved to a direction which is spaced apart from the piezoelectric element 12 (left direction in FIG. 11).

The output signals given in FIGS. 15A and 15B are pulse signals which turn on and off in synchronization with the output signals in FIGS. 14A and 14B. The two signals in FIGS. 15A and 15B are inputted to input terminals 72A and 72B of the piezoelectric element 12. As shown in FIGS. 2A and 2B, signals having the following trapezoidal wave pattern may be inputted into the input terminals 72A and 72B. However, rectangular pulse signals as shown in FIG. 15A may also be inputted to operate the piezoelectric element 12. In this instance, the rectangular pulse signals may be used for a driving signal of the piezoelectric element 12, thereby making it possible to generate signals easily.

The output signals in FIGS. 15A and 15B are constituted by two types of rectangular pulse signals to give the same frequency. Since these two pulse signals are mutually different in phase, they are signals in which the mutual difference in potential is made great in a stepwise manner and next made small abruptly or the difference in potential is made abruptly great and next made small in a stepwise manner. When such two signals are inputted, the elongating speed is made different from the contracting speed in the piezoelectric element 12, thereby allowing the driven member 516 to move.

For example, in FIGS. 15A and 15B, it is set that after one of the signals is increased to H (high) and decreased to L (low), the other signal is increased to H. In these signals, it is set that when one of them is decreased to L, the other signal is increased to H, after passage of a certain time lag $t_{OFF}$. Further, when both of these two signals are decreased to L, the signals are outputted in an off state (open state).

Signals with the frequency exceeding an audible frequency are used for the output signals in FIGS. 15A and 15B, namely, electric signals for operating the piezoelectric element 12. In FIGS. 15A and 15B, the two signals are those having the frequency exceeding an audible frequency, and they are, for example, signals with the frequency preferably from 30 to 80 kHz and more preferably from 40 to 60 kHz. The signals with the above-described frequency are used to reduce operating sound in an audible region of the piezoelectric element 12.

Next, a description is given for operation of the driving mechanism according to the present embodiment.

In FIG. 11, electric signals are inputted to a piezoelectric element 12, by which the piezoelectric element 12 elongates and contracts repeatedly. A driving member 14 reciprocates in accordance with the elongation and contraction. In this instance, the piezoelectric element 12 is allowed to elongate or contract at a different speed, thereby allowing the speed of the driving member 14 moving in a certain direction to be different from the speed moving in a reverse direction. Therefore, a driven member 516 and a zoom lens 70 are allowed to move in a desired direction.

On elongation and contraction of the piezoelectric element 12, vibration will result from the elongation and contraction. However, since an actuator 510 including the piezoelectric element 12 are supported by a support member 60 in a direction orthogonal to the elongating and contracting direction, vibration resulting from the elongation and contraction of the piezoelectric element 12 is hardly transmitted outside the actuator 510. Consequently, resonance of the actuator 510 with an external member such as a body 24 is suppressed to reduce the effect of the resonance. Therefore, the driven member 516 and the zoom lens 70 are allowed to move accurately.

As described above, also in the driving mechanism 500 of the present invention, the controller 71 drives the piezoelectric element 12 at a driving frequency f which satisfies the relationship of $f \geq 2^{1/2} \cdot f_0$, thereby making it possible to prevent resonance of the piezoelectric element 12 and also to secure a stable driving capacity constantly, as with the above embodiments.

Further, since an actuator 510 is supported in a direction orthogonal to the elongating and contracting direction of the piezoelectric element 12, vibration between the actuator 510 and an external member is hardly transmitted, thereby making it possible to reduce the effect of the resonance. It is, therefore, possible to move a driven member 516 and a zoom lens 70 accurately. Obviously, a detector 75 for detecting a movement position of the driven member is applicable to other embodiments.

It is noted that the above-described individual embodiments show one example of the driving mechanisms in the present invention. The driving mechanisms of the present invention are not restricted to these driving mechanisms shown in the embodiments but may be modified or applicable to others within a scope of the present invention, which is not deviated from the description of each Claim.

In the present invention, as described above, it is preferable to use a soft weight member. However, even where a rigid weight member is used, the driving frequency f is set at the above range, thereby making it possible to suppress the effect of the resonance and also to move the driven member accurately and stably.

Further, the actuator of the present invention may be used in small precision instruments, for example, a digital camera and a cellular phone. In particular, when the actuator of the present invention is used in a cellular phone, the driven member is allowed to move at a high speed of 2 mm/s or more. Thereby, a zoom lens which must be moved to a distance of about 10 mm is allowed to move quickly. Further, the actuator of the present invention is not restricted to an application in which zoom lenses such as a focus lens and a zoom lens are moved, but may also be used in an area where a CCD is moved.

Further, an explanation was made for a mechanism applied to the driving mechanism to drive a zoom lens 70, for example, in the fifth embodiment. However, the present invention may be applicable to a driving mechanism for driving an object other than a zoom lens 70.

According to the driving mechanism of the present invention, the electro-mechanical conversion element is driven at a driving frequency f which gives $f \geq 2^{1/2} \cdot f_0$, thereby making it possible to drive and control accurately and stably the driven member in the elongating and contracting direction of the electro-mechanical conversion element, with the effect of the resonance kept to quite a small extent, and also to establish the driving frequency f in a wider range.

The entire disclosure of each and every foreign patent application from which the benefit of foreign priority has been claimed in the present application is incorporated herein by reference, as if fully set forth.

What is claimed is:

1. A driving mechanism comprising:
    an actuator comprising:
        an electro-mechanical conversion element;
            a driving member which is connected to one end of the electro-mechanical conversion element and moves according to elongation or contraction of the electro-mechanical conversion element; and
            a weight member provided on the other end of the electro-mechanical conversion element;
        a driven member frictionally engaged with the driving member; and
        a driving circuit that drives the actuator,
    wherein the actuator allows the driven member to move along the driving member, and
    the driving circuit drives the electro-mechanical conversion element at a driving frequency f which gives $f \geq 2^{1/2} \cdot f_0$ when resonance frequency of a 1-freedom system is $f_0$ in which the electro-mechanical conversion element and the driving member are designated as a mass and the weight member is designated as a spring, and driving frequency of the electro-mechanical conversion element is f,
    wherein a material of the weight member has a greater specific gravity than the driving member and is smaller in Young's modulus than the driving member and also a material of the electro-mechanical conversion element.

2. The driving mechanism as set forth in claim 1, wherein the resonance frequency $f_0$ satisfies $f_0 \leq 70$ kHz.

3. The driving mechanism as set forth in claim 1,
    wherein the weight member is a resonance frequency-reducing member that reduces the resonance frequency of the actuator.

4. The driving mechanism as set forth in claim 3,
    wherein the weight member is the resonance frequency-reducing member, to reduce the resonance frequency of the actuator to a greater extent than a case where a weight member is a rigid material.

5. The driving mechanism as set forth in claim 1,
    wherein the driving member is supported on at least one of its leading end side and its base end side, so as to move in elongating and contracting directions of the electro-mechanical conversion element.

6. The driving mechanism as set forth in claim 1, further comprising a cabinet
    wherein the actuator is supported laterally to the cabinet in elongating and contracting directions of the electro-mechanical conversion element.

7. The driving mechanism as set forth in claim 1, further comprising a driving section that generates asymmetrical signals in elongating and contracting directions so as to drive the electro-mechanical conversion element.

8. The driving mechanism as set forth in claim 1,
    wherein the driven member is in surface contact with the driving member.

9. The driving mechanism as set forth in claim 1, further comprising a detecting section that detects a movement position of the driven member.

10. The driving mechanism as set forth in claim 1,
    wherein the electro-mechanical conversion element is driven at a driving frequency exceeding an audible frequency.

11. The driving mechanism as set forth in claim 1,
    wherein the driven member is connected to an optical member and used in a photographic optical system.

12. The driving mechanism as set forth in claim 1,
    wherein the actuator is used in a photographic optical system mounted on a cellular phone.

13. A driving mechanism comprising:
    an actuator comprising:
        an electro-mechanical conversion element;
            a driving member which is connected to one end of the electro-mechanical conversion element and moves according to elongation or contraction of the electro-mechanical conversion element; and
            a weight member provided on the other end of the electro-mechanical conversion element;

a driven member frictionally engaged with the driving member; and a driving circuit that drives the actuator, wherein the actuator allows the driven member to move along the driving member, and the driving circuit drives the electro-mechanical conversion element at a driving frequency f which gives $f \geqq 2^{1/2} \cdot f_0$ when resonance frequency of a 1-freedom system is $f_0$ in which the electro-mechanical conversion element and the driving member are designated as a mass and the weight member is designated as a spring, and driving frequency of the electro-mechanical conversion element is f, wherein a material of the weight member is 1 GPa or lower in Young's modulus and smaller in Young's modulus than the driving member and the electro-mechanical conversion element.

* * * * *